Figure 1:
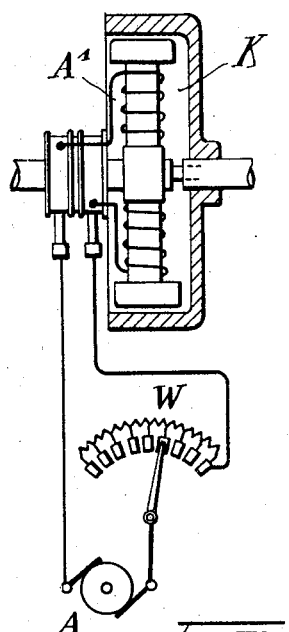

No. 704,574. Patented July 15, 1902.
R. PINTSCH.
POWER TRANSMISSION REGULATOR FOR ELECTROMAGNETIC COUPLINGS.
(Application filed Nov. 14, 1901.)
(No Model.) 2 Sheets—Sheet 1.

Witnesses:—

Inventor:—
Richard Pintsch
by Everhard Hopkins
Atty.

UNITED STATES PATENT OFFICE.

RICHARD PINTSCH, OF BERLIN, GERMANY.

POWER-TRANSMISSION REGULATOR FOR ELECTROMAGNETIC COUPLINGS.

SPECIFICATION forming part of Letters Patent No. 704,574, dated July 15, 1902.

Application filed November 14, 1901. Serial No. 82,177. (No model.)

*To all whom it may concern:*

Be it known that I, RICHARD PINTSCH, a subject of the Emperor of Germany, and a resident of Berlin, Empire of Germany, have invented a certain new and useful Improved Power-Transmission Regulator for Electromagnetic Couplings, of which the following is a full, clear, and exact description.

This invention pertains to magnetic couplings, means by which the transmitting power of the couplings may be varied, and means by which said transmitting power may be varied proportionately as the work done by a member actuated through said coupling.

The object of the present invention is to provide means whereby the speed of the driven member may be rendered independent of that of the driving-shaft irrespective of the load on the driven shaft and in any desired proportion.

My invention is illustrated in one form embodied in mechanism set forth in the accompanying drawings, in which similar reference characters denote similar parts throughout the several views.

Figure 2:
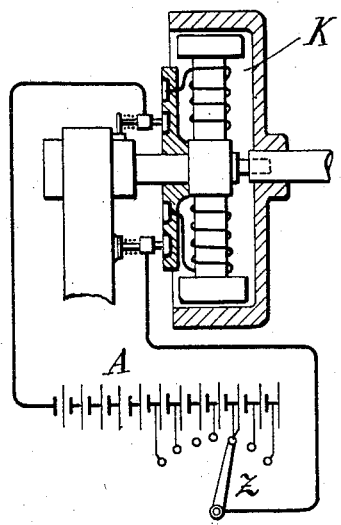
Figure 3:
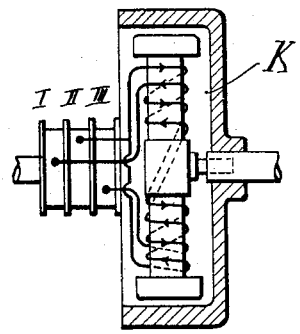
Figure 3A:
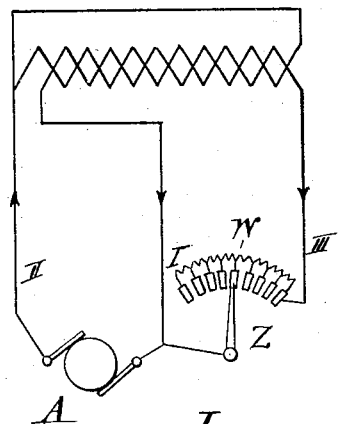
Figure 4:
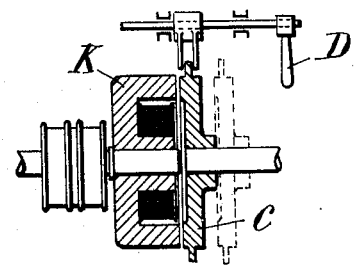
Figure 5:
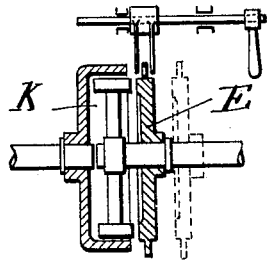
Figure 6:
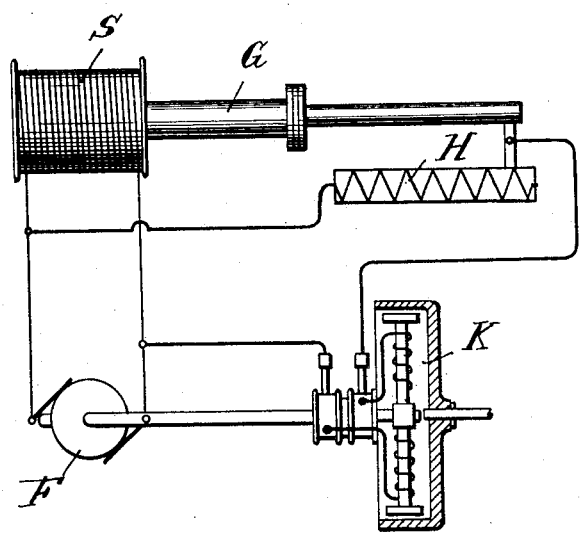

Figures 1 and 2 illustrate in section magnetic clutches in which the field exciting-currents are varied in the one case by a variable resistance interposed in the generator-circuit supplying the field and in the other by switching in or out a number of battery-cells supplying the field. Fig. 3 illustrates in section a magnetic clutch having two field-windings. Fig. 3ª is a diagrammatic view of the disposition of the field-windings of the clutch shown in Fig. 3. Fig. 4 illustrates in section a magnetic clutch provided with means for varying the air-gap between the field and the armature. Fig. 5 illustrates in section a combination device combining the principle of those shown in Figs. 1 and 4, and Fig. 6 illustrates in section a magnetic clutch in series with a variable resistance and a generator and a solenoid actuating a variable resistance and disposed in a shunt-circuit across the poles of the generator.

Referring to the drawings, the form of clutch shown in Fig. 1 is provided with a field-magnet having a winding A', said field-magnet carried by either the driving or the driven member, the pole-pieces of said field-magnet being in proximity with but not in engagement with the cylindrical armature K, carried by the other of said driving or driven members. Current is carried from the generator A through a circuit in which is interposed a variable resistance W to brushes bearing on slip-rings connected with the terminals of the coil A'. In Fig. 2 a similar arrangement is shown, except that the generator S is replaced by a series of battery-cells A, which may be cut in to the extent of any number by a switching mechanism B.

Fig. 3 shows a magnetic clutch similar in construction to the one shown in Fig. 1, but provided with two coils wound upon a field member in opposition to one another, one terminal of each of said coils terminating in a slip-ring II, while the other terminals terminate in separate slip-rings I and III. Fig. 3ª shows a diagrammatic view of the two windings on the field member of Fig. 3 and indicates the direction of the flow of the current in the said coils. It will be seen that the common supply-conductor II branches and forms two conductors I and III, which are wound upon one another in opposite directions. When current is passed through one of said coils, the field member will receive one polarity, while should the current be passed through the other of said coils the opposite polarity would result. Therefore it will be seen that if one of these coils be excited an exciting of the other of said coils to a greater or less extent will neutralize to a greater or less extent the magnetic influence of the field member. Therefore it will be seen that if the conductors I and II be directly connected to the poles of the generator A the field member will be continuously excited. Now if the variable resistance W be inserted in the conductor III (see Fig. 3ª) and said conductor be engaged with the same pole of the generator as the conductor I the flow of current through the conductor III may be regulated to neutralize to any extent the magnetism established in the field-magnet by the conductor I.

In Fig. 4 I have shown a magnetic clutch in which the armature C is movable upon either the driving or driven member to approach or recede from the field member K and a hand lever mechanism D for accomplishing this approach or recession. It is obvious that by causing the armature C to recede from the field member K the influence of the field member will be lessened thereby.

In Fig. 5 I have shown a field member similar to that of either Fig. 1 or Fig. 3, in connection with an armature E, similar to the armature C of Fig. 4. By this combination I am able to obtain a variation in the power of the clutch by varying the exciting-current of the field member or retaining the exciting-current constant and varying the air-gap between the field member and the armature E or by utilizing both of these means.

In Fig. 6 I have shown a magnetic clutch consisting of an armature member and a permanent field-producing member. A coil is wound upon said permanent field-producing member and connected in series with a variable resistance H and a generator F in such manner that the current from said generator passing through said coil will counteract to a certain extent the field tension of said permanent field-producing member. A solenoid S is provided with a core G, which carries a contact operating the variable resistance H. The greater the excitation of the solenoid S the more resistance is cut out of circuit with the coil, and the greater the pole tension of the generator the greater will be the excitation of the solenoid S. For instance, the armature K of the clutch, we will say, is driven by an engine or other means. The generator F will then be driven by the field-producing member the field of which is not counteracted by the action of the coil, as the resistance is in circuit with said coil. As the pole tension of the generator increases, due to an excess of speed, a drop in the load, or other cause, the solenoid S, which is bridged across such poles, will become more active, drawing in the core G and cutting out resistance in circuit with the coil, increasing the field-counteracting effect of said coil and reducing the field tension of the field-producing member and allowing said field-producing member to lag behind the driving-armature K to a greater degree, decreasing the speed of the generator and lowering its pole tension. Spring or other means are provided to automatically withdraw the core G of the solenoid when the solenoid S becomes less active in any of the well-known ways. When the pole tension of the generator F drops, due to the decrease in speed of said generator, resistance will be cut in circuit with the coil, thereby reëstablishing the pull between the driving and driven members of the clutch. It will be seen that this arrangement of the clutch, generator, solenoid, and resistance will produce a regulating device by which the pole tension of the generator will be maintained constant (or substantially constant) irrespective of the speed of the engine or the load upon the generator.

It is perfectly obvious that the form of clutch shown in Fig. 3 and having two counter-disposed windings may be substituted for the clutch shown in Fig. 6 by putting the resistance H in circuit with the conductor III.

I claim as my invention—

1. In a magnetic transmission device, a permanently-energized member, an armature member and electromagnetic means for counteracting the magnetism of said permanently-energized member to a greater or lesser degree.

2. In a magnetic transmission device, a permanently-magnetized member, an armature member and electromagnetic means for counteracting the magnetism of said permanently-magnetized member to a greater or lesser degree.

3. In a magnetic transmission device, a permanently-energized electromagnetic field member, an armature member, and electromagnetic means for counteracting the magnetism of said electromagnetic field member to a greater or lesser degree.

4. In a magnetic transmission device a field member having two coils wound in opposite directions thereon, a slip-ring common to one terminal of each of said coils and separate slip-rings for the remaining terminals of said coils.

5. In a magnetic coupling comprising two members having a common magnetic field, the combination of means for varying the said magnetic field consisting of an auxiliary opposing electromagnetic field member and means for controlling the field of the same.

6. In a magnetic coupling comprising armature and field-producing members, the combination of an extra field-producing member and means for energizing the same to vary the whole magnetic field.

7. In a power-transmission controlling device, the combination with a generator and a driving member therefor, of a magnetic clutch intermediate said driving member and generator, a permanent field-producing agent and an electromagnetic field-producing member in said clutch, a source of exciting-current and a variable resistance in circuit with said electromagnetic field-producing member and electromagnetic means operated by the rise or fall of potential between the poles of said generator for actuating said variable resistance to create a resultant field varying in strength inversely as the pole tension of said generator.

8. In a magnetic power-transmission device, a permanent field-producing member, an armature member, and electromagnetic means for either augmenting or decreasing the strength of field of said permanent field-producing member.

9. In a magnetic power-transmission device, a permanently-energized field-producing member, an armature member and electromagnetic means for either augmenting or decreasing the strength of the field of said permanently-energized field-producing member.

10. In combination with a driven generator and driving means therefor of a magnetic power-transmission device between said driving means and generator consisting of a permanent field-producing member, an armature and an electromagnetic field-producing member and a variable-resistance device dependent for its operation upon the rise or fall of the pole tension of said generator for controlling the field strength of said electromagnetic field-producing member to modify the resultant field of said permanent and electromagnetic field-producing members inversely as the pole tension of said generator.

In witness whereof I have hereunto set my hand in presence of two witnesses.

RICHARD PINTSCH.

Witnesses:
    WOLDEMAR HAUPT,
    HENRY HASPER.